BEST AVAILABLE COPY

T857,029

CROSS REFERENCE

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 17, 1968

857 O.G. 695

666,502

SUBSTITUTED 2-HYDROXYBENZOYLFERROCENES AND STABILIZATION OF POLYMERS THEREWITH

Gordon C. Newland and Gerald R. Lappin, both of Box 511, Kingsport, Tenn. 37662

Filed Sept. 8, 1967. Published Dec. 17, 1968
Class 260—45.75
No Drawing. 11 Pages Specification

2-hydroxy-4-dodecycloxybenzoylferrocene. This compound and other 2-hydroxybenzoylferrocenes of the structure:

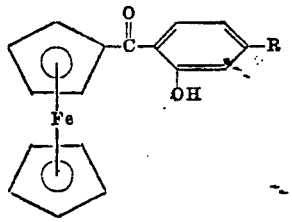

wherein R is OH, $NO_2$, acyl, aroyl, hydrocarbyl, hydrocarbyoxy or substituted derivatives thereof, are used as light stabilizers for poly-α-olefin polymers. Other stabilizers which prevent heat and oxygen degradation may be included in the polymer composition.